April 16, 1929.　　　J. L. RUSHTON　　　1,709,742
OPERATING MECHANISM FOR CLUTCHES OR THE LIKE
Filed June 15, 1926　　　2 Sheets-Sheet 1

INVENTOR
James Swer Rushton
by
Byrnes, Stebbins & Parmelee
His Attorneys

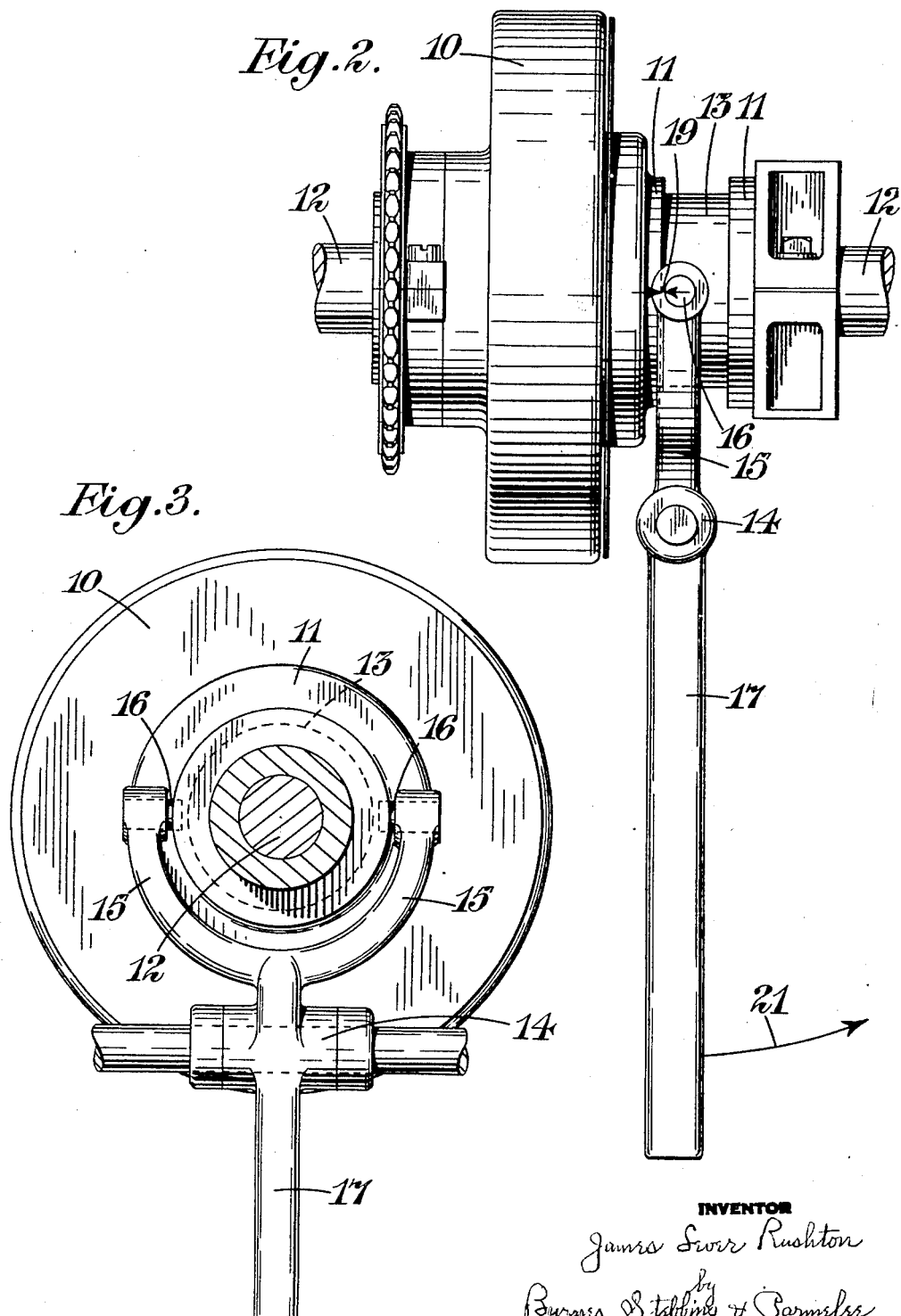

Patented Apr. 16, 1929.

1,709,742

UNITED STATES PATENT OFFICE.

JAMES LEVER RUSHTON, OF BOLTON, ENGLAND.

OPERATING MECHANISM FOR CLUTCHES OR THE LIKE.

Application filed June 15, 1926, Serial No. 116,139, and in Great Britain September 12, 1925.

This invention is for improvements in or relating to operating mechanism for a clutch or the like, and is concerned with mechanism of the type in which a rotating sleeve has endwise movement imparted to it by a controlling member, such as a lever, which inter-engages with it. For this purpose the lever may be forked and have inwardly-directed pins on the fork to engage a groove in the sleeve, or alternatively the end of the lever could be slotted to engage a flange on the sleeve. The invention may be used in operating mechanism intended for purposes other than controlling a clutch, such for example as in a change-speed gear for imparting axial movement to a gear-wheel.

One of the disadvantages of mechanism of the type above set forth is the friction between the rotary sleeve and the stationary lever. In cases in which the sleeve rotates at a high speed, the friction is particularly disadvantageous owing to the excessive wear which reduces the life of the parts and involves the cost of replacement of the parts, and it is an object of the present invention to provide a construction in which the friction is entirely, or practically entirely, eliminated.

This invention comprises operating mechanism of the type described for a clutch or the like, wherein the inter-engaging parts of the controlling member and the sleeve (for example the pins and the groove) are so proportioned that, without removing said parts from inter-engagement, the controlling member can occupy a position in which it is not in contact with the rotating sleeve.

According to another feature of the invention, the inter-engaging parts of the controlling member and sleeve aforesaid are so proportioned as to provide lost motion in the operating movement of the controlling member, and the controlling member is yieldingly controlled (for example by its weight) in such manner as automatically to return from the limiting position of each operative movement to a position where the inter-engaging parts aforesaid are out of contact with one another. Preferably the parts are so constructed and arranged as to permit the controlling member to return automatically from either of its limiting positions to substantially the same central position. Thus the spacing apart of the striking flanges in the direction of movement of the sleeve may be arranged to be not less than the sum of the operative stroke of the sleeve, the width of the striking-pin and a running clearance on each side thereof.

For a more complete understanding of the invention, there will now be described, by way of example only, and with reference to the accompanying drawings, one constructional form of clutch operating mechanism according to the invention. It is to be understood, however, that the invention is not restricted to the precise constructional details set forth.

In these accompanying drawings—

Figure 2 is a view, similar to Figure 1, but showing the parts after the clutch has been disengaged, and Figure 3 is a section on the line 3—3 of Figure 1.

Like reference numerals indicate like parts throughout the drawings.

Figure 1:
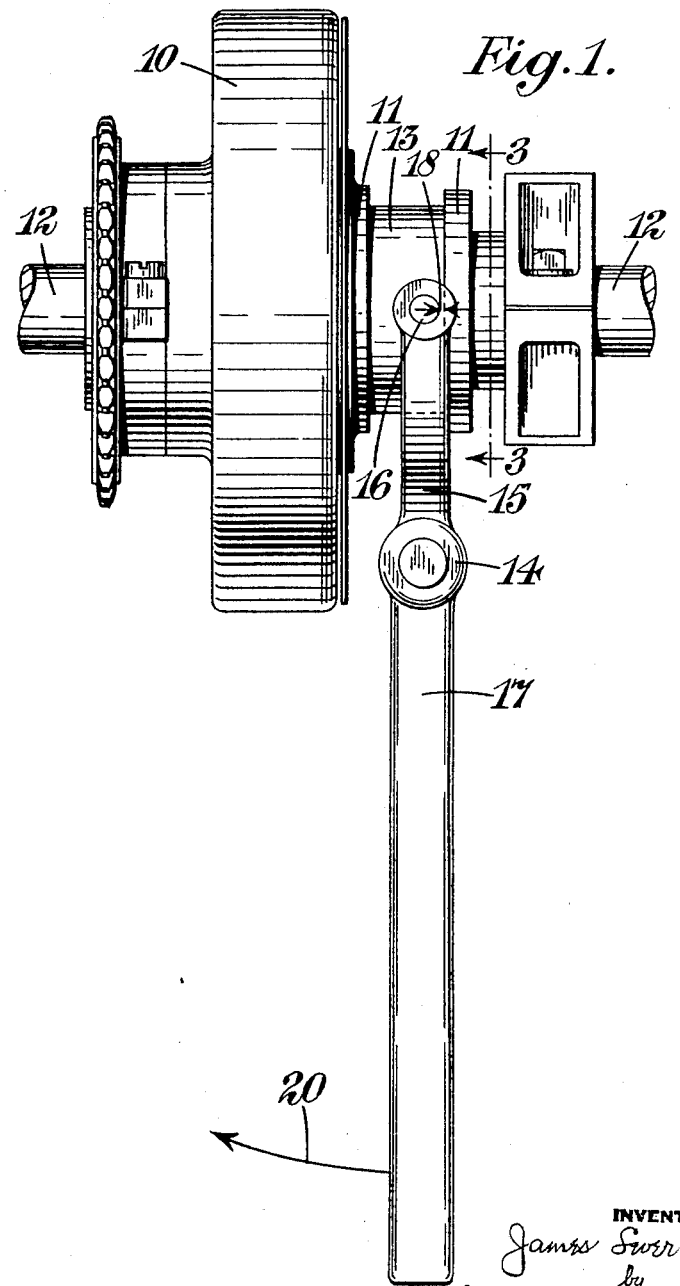
Figure 1 is a side elevation showing a clutch and clutch-lever according to this invention, the clutch being shown in its engaged position.

Referring to the drawings, the clutch itself, indicated generally by the reference 10, may be of any desired construction, and it is operated by means of a sleeve 11 which is movable axially of the shaft 12 wherewith the clutch is used. This sleeve 11 is formed with a groove 13 in it, to be engaged by the clutch-operating lever. In the particular construction illustrated, this lever is pivotally mounted at 14 and has a forked end 15, with inwardly-directed pins 16 on the arms of the fork to project into the groove 13 between the side-walls thereof. The other end 17 of the lever constitutes the operating handle. As illustrated, the lever is preferably so arranged that it hangs in a vertical position, it being pivoted about a horizontal axis and formed with its handle 17 heavier than the forked end 15, so that the lever is pendulous and when released, tends to return automatically to the same or substantially the same position.

The width of the groove 13, measured parallel with the direction of movement of the sleeve 11, is made greater than the diameter of the pins 16, the width of the groove being not less than the sum of the axial movement which is to be imparted to the sleeve, the diameter of a pin 16 and a further amount constituting a running clearance at each side of the pins 16, as indicated at 18, 19, when the sleeve is in its limiting positions. With this arrangement, the pins 16 are maintained definitely out of contact with the side-walls of the groove 13 when the parts are in their normal working positions, whether the clutch be engaged or disengaged.

Referring to Figure 1, wherein the clutch is shown in its engaged position, when it is desired to disengage the clutch, the handle end 17 of the lever is swung to the left, as indicated by the arrow 20. The first part of the movement takes up the clearance 18, and then the pins 16, by their engagement with the side-wall of the groove 13, impart axial movement to the sleeve 11 towards the right, thereby moving it into the position illustrated in Figure 2. The handle 17 is thereupon released and, being pendulous, it returns to its normal vertical position, illustrated in Figure 2, in which the pins 16 are separated from the adjacent side-wall of the groove 13 by a running clearance 19. Similarly, when the clutch is to be moved to its engaged position, the lever is swung, from the position shown in Figure 2, in the direction indicated by the arrow 21, so as to move the sleeve 11 towards the left, all of the parts finally returning to the position shown in Figure 1. It will be seen, therefore, that there is no contact between the pins 16 and the side-walls of the groove 13 except during the brief time in which the actual engaging or disengaging movement of the clutch is taking place. It follows, therefore, that there are no objectionable friction effects arising in this mechanism, and the mounting of the operating-lever in such a manner that it can always come to rest freely, under the action of gravity, in a position in which it is not in contact with the clutch-operating sleeve 11, prevents any chance of the weight of the lever operating the clutch or causing any inadvertent or irregular starting or stopping of the clutch-mechanism.

I claim:—

1. Operating mechanism for a clutch or the like comprising a rotary sleeve and a manually operated controlling member which inter-engages with said sleeve to impart endwise movement thereto, the sleeve being adapted to remain in either of its positions independently of the controlling member, the inter-engaging parts of the controlling member and sleeve being so proportioned that, while the parts are in their normal relative position, the controlling member can occupy under the action of gravity a position in which it is not in contact with the rotating sleeve, for the purpose set forth.

2. Operating mechanism for a clutch or the like comprising a rotary sleeve and a manually operated controlling member which have pin and groove inter-engagement with each other whereby the controlling member can impart endwise movement to the sleeve, the said pin and groove being so proportioned that, without moving the pin out of the groove, the controlling member can occupy under the action of gravity a position in which the pin is not in contact with the sides of the groove, for the purpose set forth.

3. Operating mechanism for a clutch or the like comprising a grooved rotary sleeve, a manually operated controlling lever for said sleeve and a pin on said lever to engage the groove in the sleeve and permit the lever to impart endwise movement to the sleeve, the said pin and groove being so proportioned that, without moving the pin out of the groove, the lever can occupy under the action of gravity a position in which the pin is not in contact with the sides of the groove, for the purpose set forth.

4. Operating mechanism for a clutch or the like comprising a rotary sleeve, a manually operated controlling member which inter-engages with said sleeve to impart endwise movement thereto, the inter-engaging parts of the controlling member and sleeve being so proportioned as to provide lost motion in the operating movement of the controlling member, and gravity control for said member operating to cause it to return automatically from the limiting position of an operative movement of the sleeve in each direction to a position where the inter-engaging parts are out of contact with one another, for the purpose set forth.

5. Operating mechanism for a clutch or the like comprising a rotary sleeve and a manually operated controlling lever which inter-engages with said sleeve to impart endwise movement thereto, the inter-engaging parts of the lever and sleeve being so proportioned as to provide lost motion in the operating movement of the lever, and the said lever being so pivoted that its weight automatically operates to cause it to return from the limiting position of each operative movement to a position where the inter-engaging parts are out of contact with one another for both positions of the sleeve, for the purpose set forth.

6. Operating mechanism for a clutch or the like comprising a rotary sleeve, a manually operated controlling member which inter-engages with said sleeve to impart endwise movement thereto, the inter-engaging parts of the controlling member and sleeve being so proportioned as to provide lost motion in the operating movement of the controlling member, and gravity control for said member operating to cause it to return automatically from the limiting position of each operative movement to substantially the same position within the confines of the sleeve where the inter-engaging parts are out of contact with one another, for the purpose set forth.

7. Operating mechanism for a clutch or the like comprising a rotary sleeve, a manually operated controlling member therefor, and striking flanges and a striking pin respectively one on each of said parts, which striking flanges and striking pin inter-engage with each other to enable the controlling member to impart endwise movement to the sleeve, the said pin and the distance between the striking flanges being so proportioned that, without moving the pin out of position between said flanges, the controlling member can occupy under the action of gravity a position in which the pin is not in contact with the said flanges, for the purpose set forth.

8. Operating mechanism for a clutch or the like comprising a rotary sleeve, a manually operated controlling member therefor, and striking flanges and a striking pin respectively one on each of said parts, which striking flanges and striking pin inter-engage with each other to enable the controlling member to impart endwise movement to the sleeve, the distance between the striking flanges being such as not to be less than the sum of the operative stroke of the sleeve, the width of the striking pin and the running clearance on each side thereof, the striking flanges and pin being normally out of engagement with each other for both positions of the clutch, for the purpose set forth.

In testimony whereof I affix my signature.

JAMES LEVER RUSHTON.